Jan. 6, 1942.  R. G. McMAHON  2,268,551
ICE CREAM REFRIGERATOR
Filed Dec. 12, 1938  4 Sheets-Sheet 1
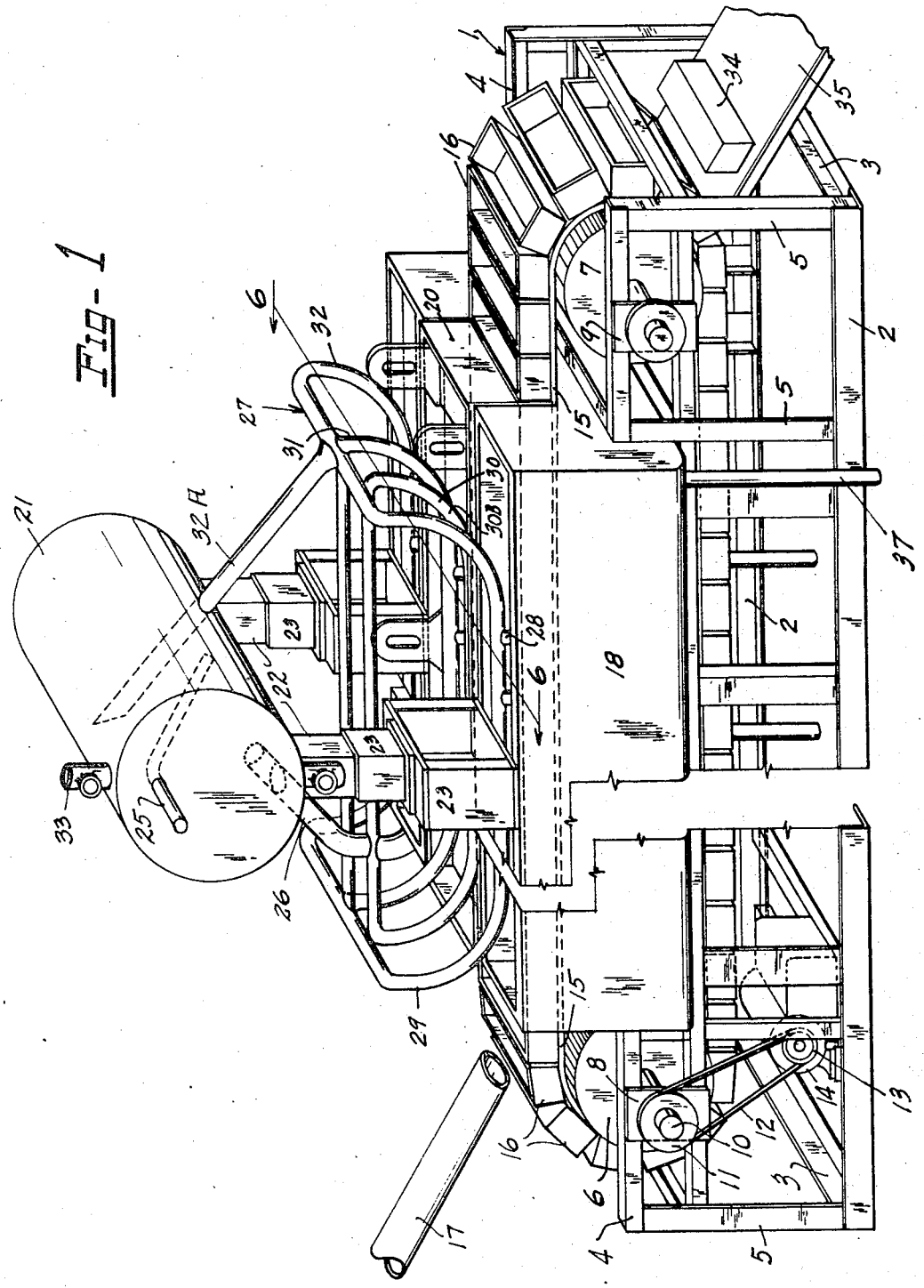
RAYMOND G. McMAHON
INVENTOR
BY
James H. Kinnaw
ATTORNEY Jan. 6, 1942.  R. G. McMAHON  2,268,551
ICE CREAM REFRIGERATOR
Filed Dec. 12, 1938  4 Sheets-Sheet 2
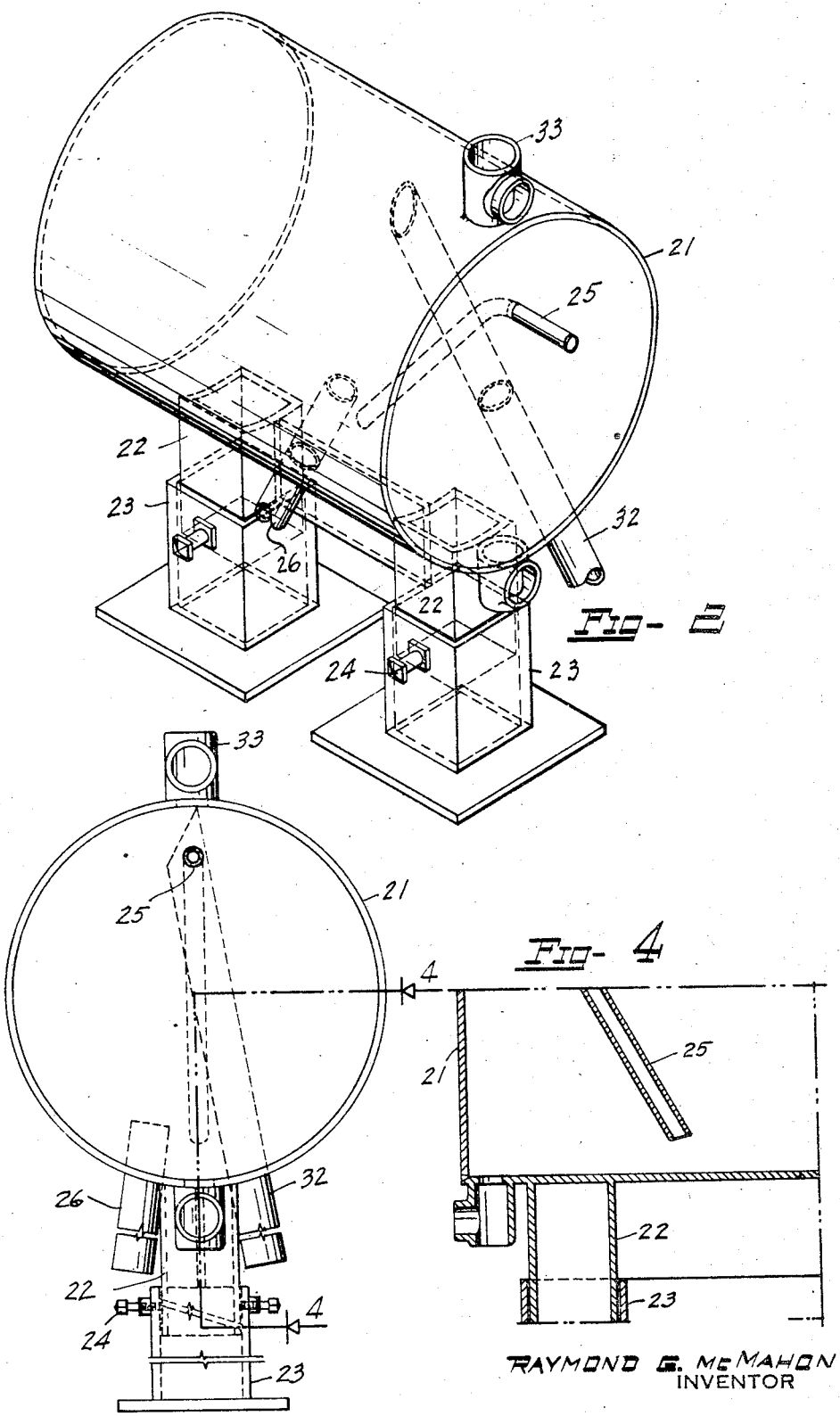
RAYMOND G. McMAHON
INVENTOR
BY James D. Girnau
ATTORNEY Jan. 6, 1942.  R. G. McMAHON  2,268,551
ICE CREAM REFRIGERATOR
Filed Dec. 12, 1938  4 Sheets-Sheet 3

RAYMOND G. McMAHON
INVENTOR

BY James *[signature]*
ATTORNEY

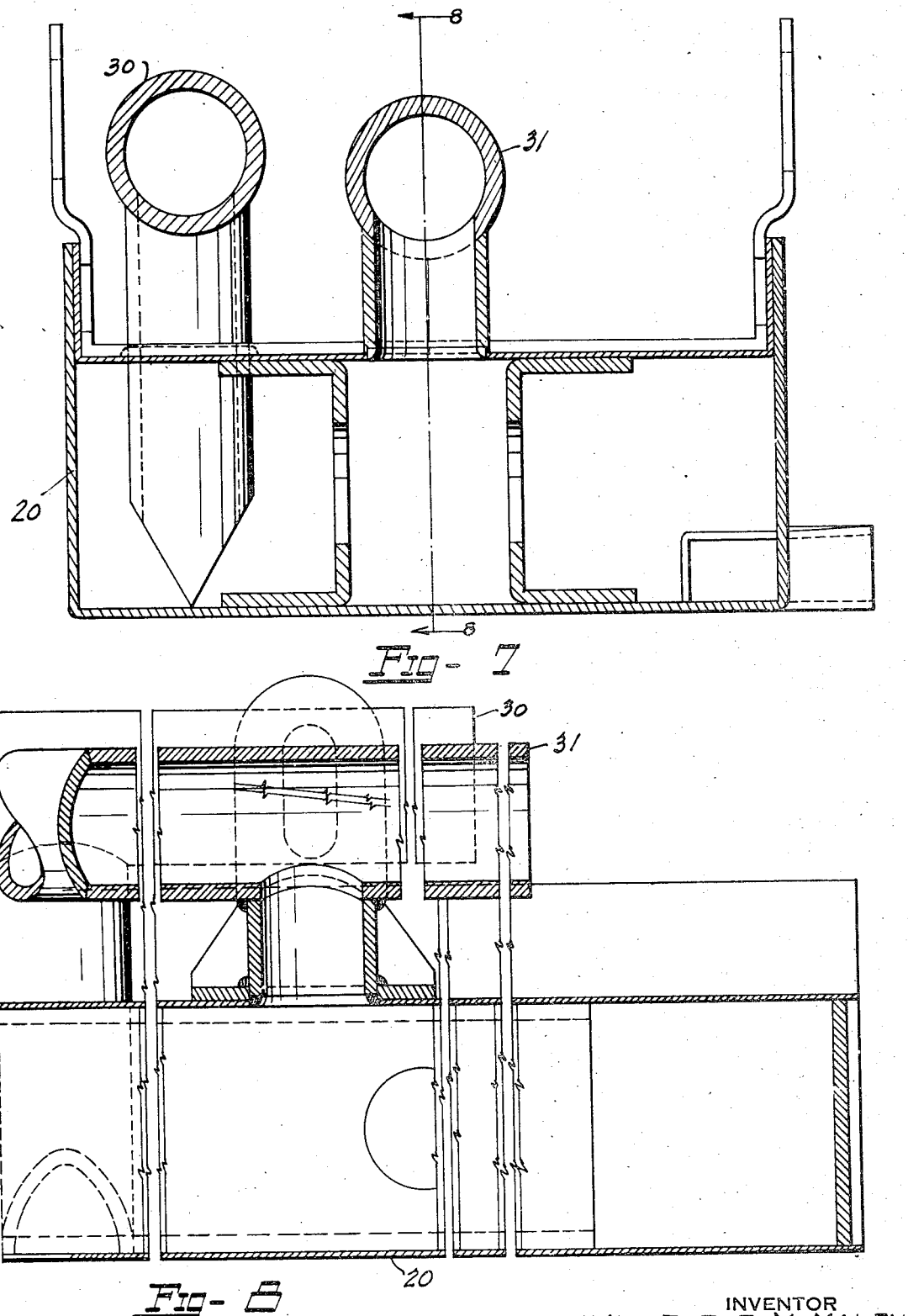

Patented Jan. 6, 1942

2,268,551

UNITED STATES PATENT OFFICE 2,268,551

ICE CREAM REFRIGERATOR

Raymond G. McMahon, Portland, Oreg., assignor to Fred Meyer, Inc., Portland, Oreg.

Application December 12, 1938, Serial No. 245,194

2 Claims. (Cl. 62—114)

This invention relates to improvements in apparatus for freezing ice cream or similar products.

The principal object of the invention is the provision of apparatus of this character which will freeze ice cream and like products rapidly in a continuous flow, in a minimum amount of time; thereby producing a more uniform texture of the product itself. The rapid freezing prevents the forming of large crystals in the product, and thus produces ice cream of fine texture.

The apparatus and methods now common in the art require approximately twelve hours to produce a hardened brick of ice cream; but with my apparatus the product is discharged from the apparatus in a hardened and finished condition, and thus eliminates the use of large storage coolers or hardening rooms and the resultant loss of time in hardening the product.

The foregoing and other objects will appear as my invention is more fully hereinafter described in the following specification, illustrated in the accompanying drawings, and finally pointed out in the appended claims.

In the drawings:

Figure 1 is a perspective view of the assembled apparatus.

Figure 2 is a perspective detail view of a surge tank.

Figure 3 is an end elevation of Figure 2.

Figure 4 is a fragmentary sectional view taken on the line 4—4 of Figure 3.

Figure 7 is an enlarged sectional detail view of intake and outlet pipes extending from the surge tank.

Figure 8 is a longitudinal sectional view taken along the line 8—8 of Figure 7.

Figure 6:
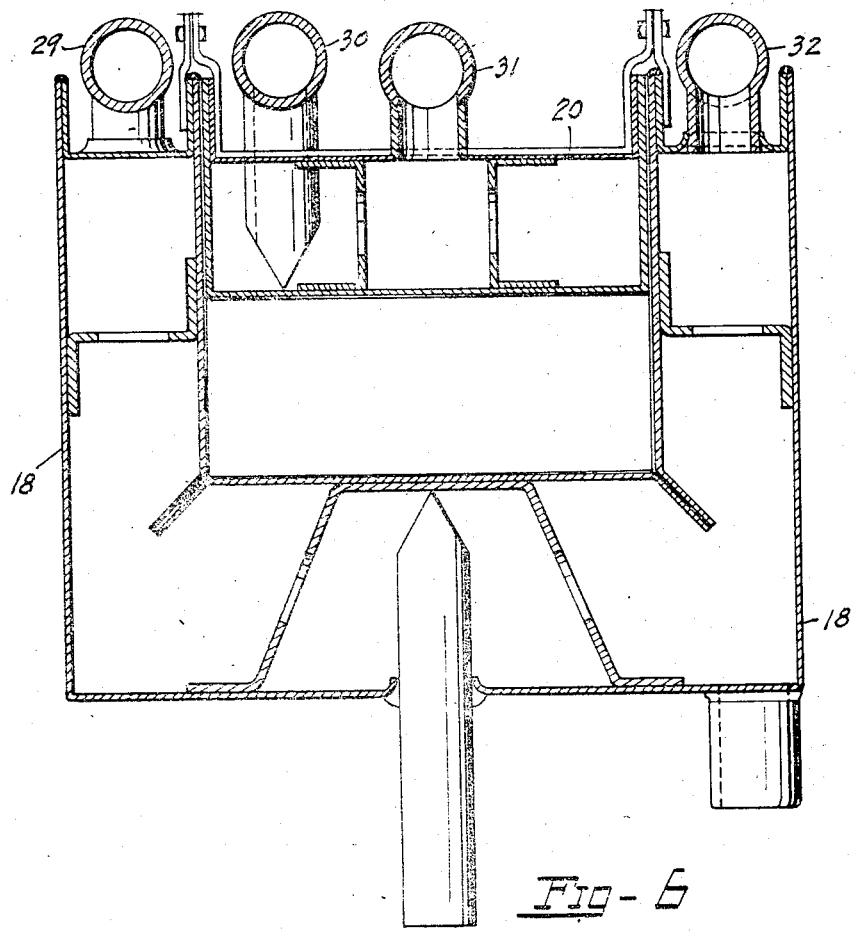
Figure 6 is an enlarged sectional view taken on the line 6—6 of Figure 1.

Referring now more particularly to the drawings, reference numeral 1 indicates generally a supporting frame structure consisting of parallel longitudinal base members 2 and parallel transverse base members 3, also corresponding upper longitudinal members 4. The members 4 are mounted to the base members by vertical members 5 by bolting, riveting, welding, or the like.

Near each end of the supporting structure are rotatably mounted conveyor drums 6 and 7 in bearings 8 and 9 respectively. The shaft 10 of drum 6 is provided with a pulley 11 embraced by a driving belt 12, which embraces a driving pulley 13 on a motor 14 mounted within the supporting frame.

An endless conveyor belt 15 operatively embraces both drums 6 and 7. The drum 7 is an idling drum, and is driven by the drum 6 through the medium of the conveyor belt. The belt is provided with a plurality of transversely arranged molds or trays 16 to receive ice cream in a semi-frozen state from a discharge pipe 17, extending from any approved type of freezer; not shown, and not forming a part of this invention. The trays are preferably of yieldable and flexible construction to facilitate removal of the product when hardened and finished into solid bricks.

Figure 5:
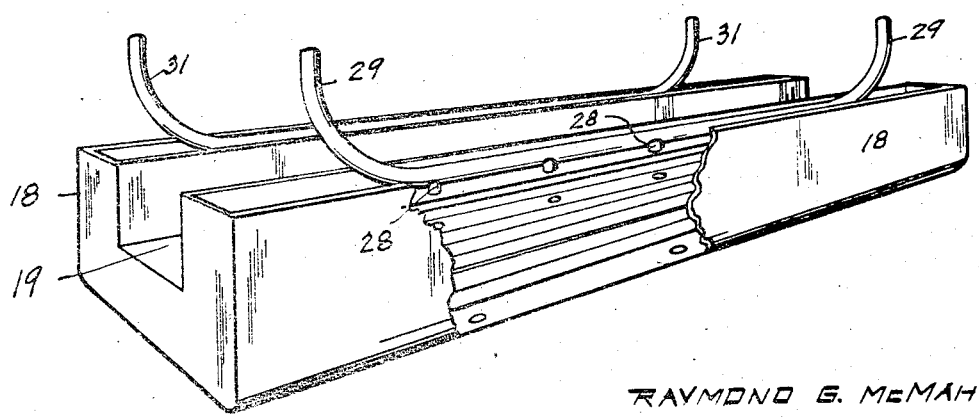
Figure 5 is a perspective view of a refrigeration tank.

Mounted upon the supporting frame and embracing the conveyor belt and its trays, is a refrigeration tank 18, constructed as best illustrated in Figure 5, and formed with a central longitudinal channel 19 for the passage of the conveyor belt and its trays therethrough. Arranged above the trays is another refrigeration tank 20 which closes up the top of the channel so that the trays will be completely surrounded by the tank. The refrigeration tanks 18 and 20 are normally filled with liquid ammonia, supplied from a surge tank 21 which is superimposed above the refrigeration tanks and adjustably mounted with respect thereto by means of columns 22 slidably mounted within supports 23 which are secured to the top of tank 18. Set screws 24 are provided in the supports 23 for locking the columns 22 in any adjusted position with respect thereto.

The surge tank obtains its supply of liquid ammonia from a feed line 25 coming from a source of supply. An outlet pipe 26 extends from the bottom of the surge tank to the framework of the pipes 27 and directs liquid ammonia thereinto for distribution to the refrigeration tanks through a plurality of depending pipes 28 from the bottom of the framework. The pipe 29 of the framework supplies liquid ammonia to one side of the refrigeration tank, and the pipe 30 supplies the tank 20. Pipe 31 is an outlet or exhaust pipe from the tank 20, and pipe 32 is an exhaust pipe from the opposite side of the refrigeration tank 18. After the refrigeration tanks are filled with liquid ammonia, the heat of the ice cream, which enters the apparatus at about 28° F., is absorbed by the liquid ammonia and the gas generated by such heat absorption, works its way back through the exhaust pipes into the pipe frame and thence back into the surge tank through pipe 32A.

The pressure of the accumulated gas on top of the liquid level or liquid ammonia level within the surge tank may be increased or decreased according to the amount of suction applied to the interior of the tank through the fitting 33. Increasing the suction to the interior of the tank causes fast hardening of the ice cream, and decreased suction will cause slow hardening.

In the operation of the machine, the ice cream is delivered from the freezer through the pipe 17 into the molds or trays 16, which, with the conveyor belt move from left to right, as viewed in Figure 1, at a predetermined rate of speed to produce a desired degree of hardening of the ice cream. When the trays reach their end of travel at the right hand end of the machine and move downwardly around the drum the hardened bricks of ice cream 34 fall by gravity from the tray on to a slide 35 or other suitable means for conveying the finished product away from the discharge end of the apparatus.

The bottom of the tank 18 is also provided with a drain pipe 37 which is connected with a drain trap for draining off the oil from the refrigerant.

While I have shown and described a particular form of embodiment of my invention, I am aware that many minor changes therein will readily suggest themselves to others skilled in the art without departing from the spirit and scope of my invention.

Having thus described my invention, what I claim as new and desire to protect by Letters Patent is:

1. Apparatus for freezing food products, comprising a refrigeration tank substantially U-shaped in cross section to form a longitudinal channel therein, an endless conveyor adapted to travel through said channel, a second refrigeration tank removably disposed within the channel and disposed above the conveyor so that the same will be entirely surrounded by the refrigeration tanks, a surge tank disposed above the refrigeration tanks and means for distributing a refrigerant from the surge tank into the refrigeration tanks and for circulating the refrigerant therethrough.

2. Apparatus for freezing food products, comprising a refrigeration tank subtsantially U-shaped in cross section to form a longitudinal channel therein, an endless conveyor adapted to travel through said channel, a second refrigeration tank removably disposed within the channel and disposed above the conveyor so that the same will be entirely surrounded by the refrigeration tanks, a surge tank disposed above the refrigeration tanks, means for distributing a refrigerant from the surge tank into the refrigeration tanks and for circulating the refrigerant therethrough, said conveyor comprising an endless belt having a plurality of molds secured thereto.

RAYMOND G. McMAHON.